(12) United States Patent
Sambongi

(10) Patent No.: US 8,724,898 B2
(45) Date of Patent: May 13, 2014

(54) SIGNAL PROCESSOR AND STORAGE MEDIUM STORING SIGNAL PROCESSING PROGRAM

(75) Inventor: Masao Sambongi, Hachioji (JP)

(73) Assignee: Olympus Corporation, Tokyo (JP)

( * ) Notice: Subject to any disclaimer, the term of this patent is extended or adjusted under 35 U.S.C. 154(b) by 363 days.

(21) Appl. No.: 12/770,955

(22) Filed: Apr. 30, 2010

(65) Prior Publication Data

US 2010/0208993 A1    Aug. 19, 2010

Related U.S. Application Data

(63) Continuation of application No. PCT/JP2008/070373, filed on Nov. 4, 2008.

(30) Foreign Application Priority Data

Nov. 5, 2007   (JP) .................................. 2007-287279

(51) Int. Cl.
  *G06K 9/00* (2006.01)
  *G06K 9/34* (2006.01)
  *G06K 9/38* (2006.01)

(52) U.S. Cl.
  USPC ........... 382/170; 382/165; 382/167; 382/171; 382/172

(58) Field of Classification Search
  USPC .................................................. 382/168–172
  See application file for complete search history.

(56) References Cited

U.S. PATENT DOCUMENTS

| 6,373,991 | B1 * | 4/2002 | Shimazu et al. | 382/274 |
| 2001/0016064 | A1 * | 8/2001 | Tsuruoka et al. | 382/167 |
| 2003/0152283 | A1 | 8/2003 | Moriwaki | |
| 2004/0184673 | A1 * | 9/2004 | Watanabe | 382/274 |
| 2005/0122287 | A1 * | 6/2005 | Nishitani et al. | 345/63 |
| 2007/0092154 | A1 * | 4/2007 | Kato et al. | 382/254 |
| 2007/0248282 | A1 * | 10/2007 | Suzuki | 382/282 |
| 2007/0292019 | A1 * | 12/2007 | Terakawa | 382/159 |

FOREIGN PATENT DOCUMENTS

| JP | 2000-057335 A | 2/2000 |
| JP | 2000-324363 A | 11/2000 |
| JP | 2002-027285 A | 1/2002 |
| JP | 2002-163738 A | 6/2002 |
| JP | 2007-124453 A | 5/2007 |

* cited by examiner

*Primary Examiner* — Amir Alavi
*Assistant Examiner* — Kenny Cese
(74) *Attorney, Agent, or Firm* — Holtz, Holtz, Goodman & Chick, PC

(57) ABSTRACT

A signal processor which performs gradation conversion processing using a histogram of an image signal is provided with a feature calculating unit which calculates a feature of the image signal; an interval setting control unit which sets intervals of a pixel value in the histogram when a histogram of the image signal is obtained, according to the calculated feature, so as to obtain the histogram of the local region of the image signal; a gradation-conversion-characteristic calculating unit which calculates a gradation conversion characteristic, using the histogram obtained by using the intervals set at the interval setting control unit; and a gradation converting unit which performs gradation conversion to the image signal using the gradation conversion characteristic.

18 Claims, 14 Drawing Sheets

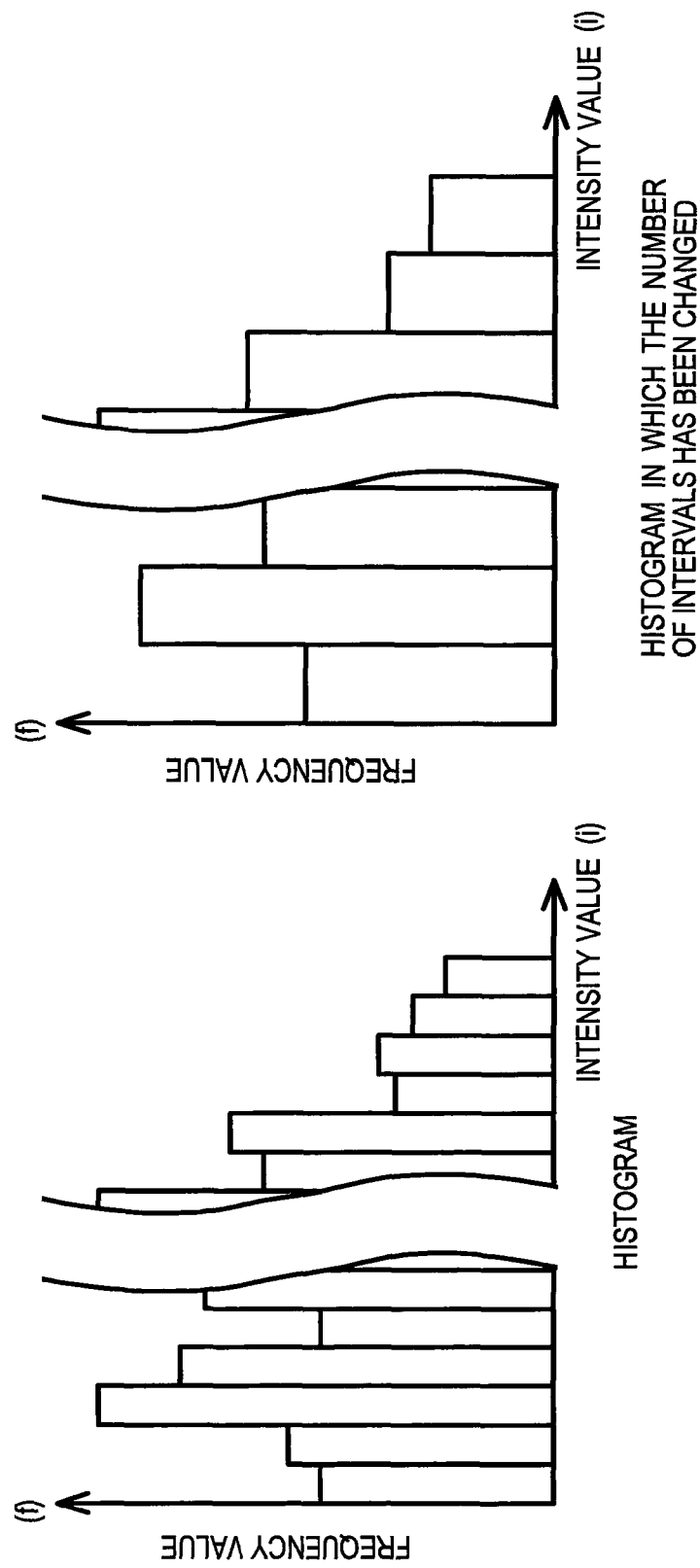

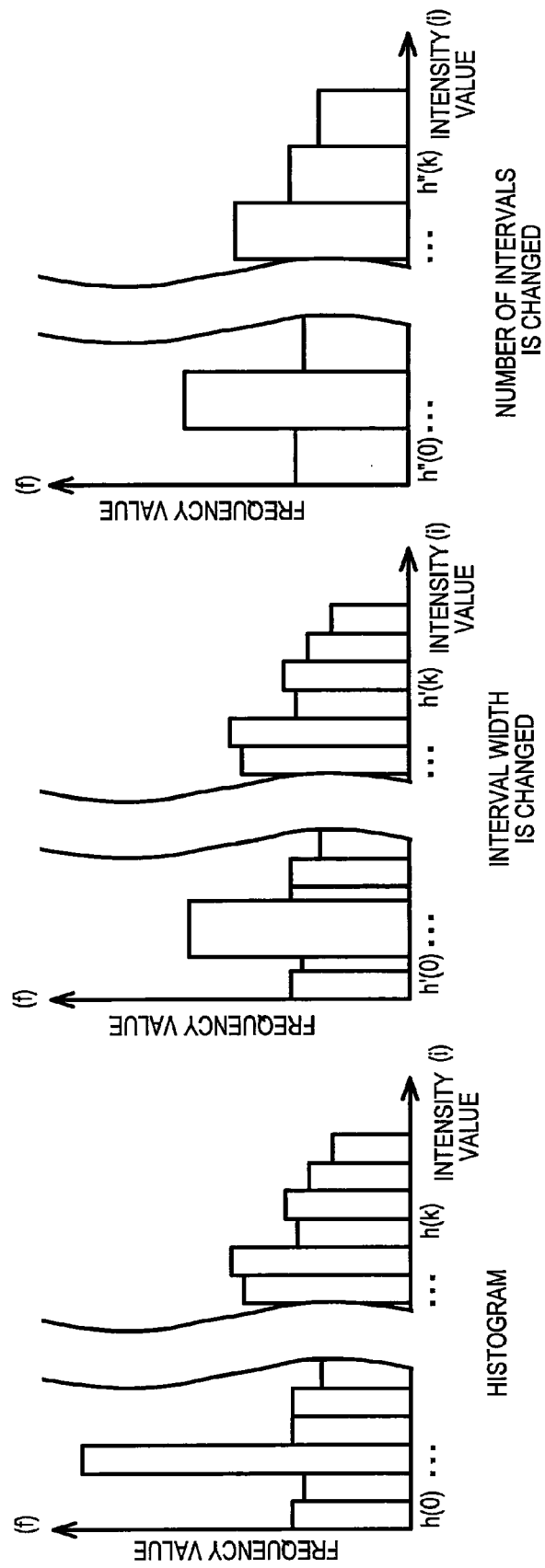

SIGNAL PROCESSOR AND STORAGE MEDIUM STORING SIGNAL PROCESSING PROGRAM

CROSS REFERENCE TO RELATED APPLICATIONS

This application is a continuation of International Patent Application No. PCT/JP2008/070373, filed on Nov. 4, 2008, which claims the benefit of Japanese Patent Application No. JP 2007-287279, filed on Nov. 5, 2007, which are incorporated by reference as if fully set forth.

FIELD OF THE INVENTION

The present invention relates to gradation conversion processing of an image signal, and in particular to an image signal processor and an image signal processing program which performs gradation conversion processing using a histogram of an image signal.

BACKGROUND OF THE INVENTION

In signal processing of an imaging system such as a current digital still camera or a current video camera, such processing as gradation-converting an image signal is often performed. As one method of the gradation conversion processing, there is a method of calculating a gradation conversion characteristic using a histogram of an image signal. For example, in JP2007-124453A, a feature of contents is determined based upon information obtained from a histogram of an inputted image signal, so that contrast adjustment according to a feature of contents is made possible.

SUMMARY OF INVENTION

An image processor according to an aspect of the present invention is a signal processor which performs gradation conversion processing using a histogram of an image signal, comprising a feature calculating unit which calculates a feature of the image signal, a local-region extracting unit which extracts a local region centering a target pixel of the image signal, an interval-setting control unit which sets intervals of pixel values in the histogram according to the calculated feature so as to obtain the histogram of the local region of the image signal, a gradation-conversion-characteristic calculating unit which calculates a gradation conversion characteristic with respect to the local region, using the histogram of the local region obtained by using the intervals set at the interval-setting control unit, and a gradation converting unit which performs gradation conversion on the local region of the image signal using the gradation conversion characteristic.

The details as well as other features and advantages of this invention are set forth in the remainder of the specification and are shown in the accompanying drawings.

BRIEF DESCRIPTION OF DRAWINGS

FIG. 4A is a histogram before the number of intervals is changed,
and FIG. 4B is a histogram after the number of intervals is changed.
FIG. 7A is an example of a histogram,
FIG. 7B is a histogram after widths of intervals are changed,
and FIG. 7C is a histogram after widths of intervals are changed.

DESCRIPTION OF THE PREFERRED EMBODIMENT

Figure 1:
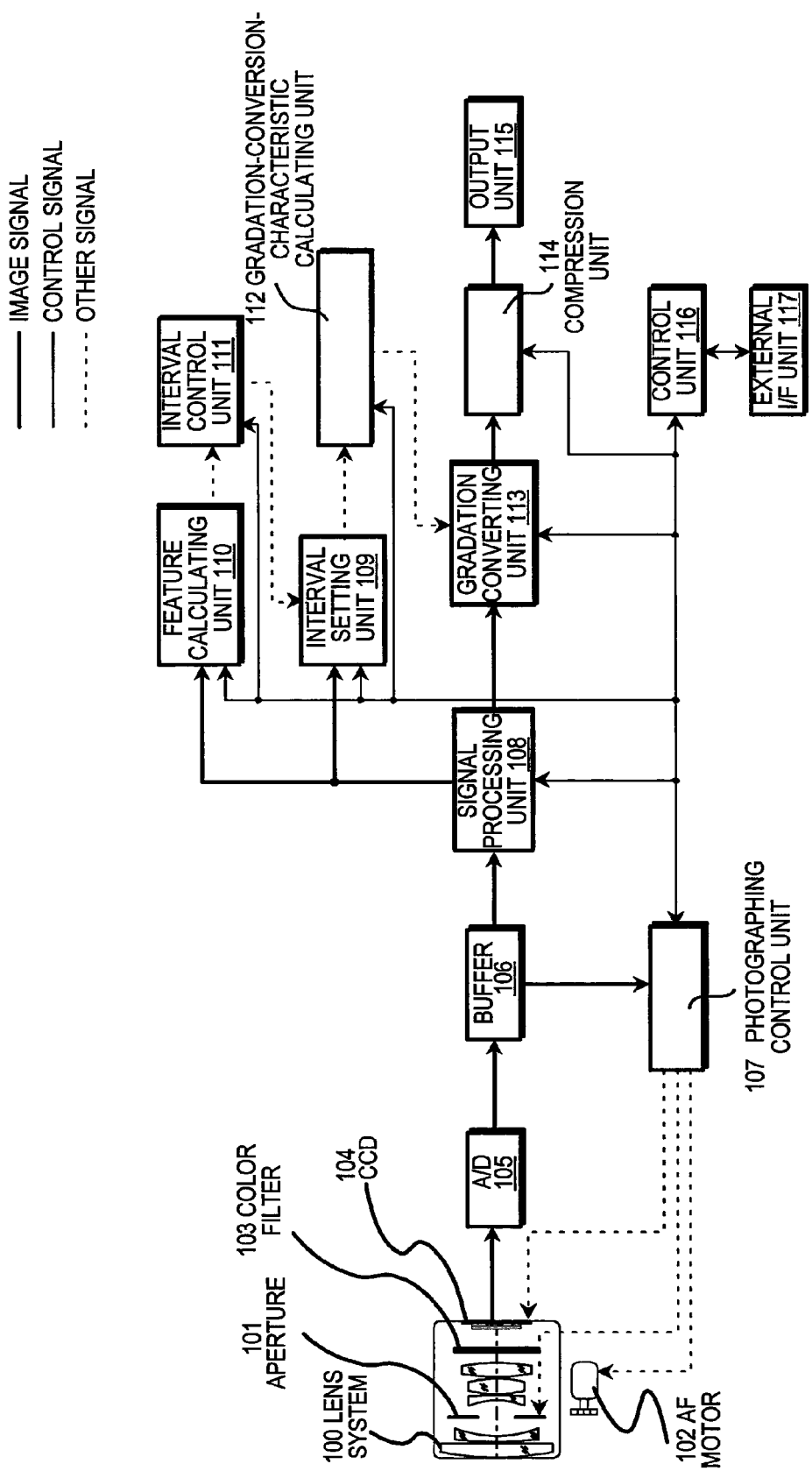
FIG. 1 is a schematic diagram of a signal processor according to a first embodiment.

FIG. 1 is a schematic diagram of a signal processor according to a first embodiment. An image taken via a lens system 100, an aperture 101, a color filter 103 and a CCD (charge-coupled device) 104 is converted into a digital signal at an A/D (analog-digital converter) 105. The image signal from the A/D 105 is transferred to a signal processing unit 108 via a buffer 106. The signal from the buffer (buffer memory) 106 is also transferred to the photographing control unit 107.

The photographing control unit 107 is connected to the aperture 101, an AF motor (motor for autofocusing) 102 and a CCD 104. The signal processing unit 108 is connected to an interval setting unit 109 and a feature calculating unit 110. The interval setting unit 109 is connected to a gradation-conversion-characteristic calculating unit 112. The feature calculating unit 110 is connected to the interval control unit 111. The interval control unit 111 is connected to the interval setting unit 109. The gradation-conversion-characteristic calculating unit 112 is connected to the gradation converting unit 113. The gradation converting unit 113 is connected to a compression unit 114. The compression unit 114 is connected to an output unit 115.

A control unit 116 such as a microcomputer is bidirectionally connected to the photographing control unit 107, the signal processing unit 108, the interval setting unit 109, the feature calculating unit 110, the interval control unit 111, the gradation-conversion-characteristic calculating unit 112, the gradation converting unit 113 and the compression unit 114. Further, an external I/F unit (interface unit) 117 provided with a power switch, a shutter button, and an interface for switching various modes at a photographing time is bidirectionally connected to the control unit 116.

The respective units (or the whole units) of the signal processor may be constituted by a logic circuit. Alternatively, the respective units (or the whole units) of the signal processor may be constituted by a memory that stores data, a memory that stores a calculation program, a CPU (Central Processing Unit) that executes the calculation program, an input/output interface, and so on.

In FIG. 1, the flow of a signal is explained. By pressing the shutter button (not shown) halfway after setting photographing conditions such as an ISO sensitivity and an exposure via the external I/F unit 117, the signal processor is put into a pre-photographing mode. The image signal taken via the lens system 100, the aperture 101, the color filter 103, and the CCD 104 is converted into a digital signal at the A/D 105 and transferred to the buffer 106. Incidentally, in this embodiment, the CCD 104 is assumed to be a single CCD of an RGB primary color system, and the number of gradations (bit lengths) of a signal obtained by the A/D 105 is, for example, 12 bits (4096 gradations).

The image signal within the buffer 106 is transferred to the photographing control unit 107. The photographing control unit 107 detects contrast information of the image signal within an AF area, and controls the AF motor 102 to maximize the contrast to obtain a focusing signal, thereby obtaining distance information. Alternatively, distance information at a focusing position may be obtained by measuring a distance from a main photographic subject using an external infrared sensor (not shown) and accordingly controlling the AF motor 102 without obtaining the image signal at the pre-photographing time. The photographing control unit 107 controls the aperture 101, electronic shutter speed of the CCD 104 and the like to obtain appropriate exposure using an intensity (or brightness) level in the signal or an intensity (light metering) sensor (not shown).

Next, the shutter button (not shown) is fully pressed via the external I/F unit 117 to perform actual photographing. The actual photographing is performed based upon focusing conditions and exposure conditions obtained by the photographing control unit 107, and the information of these conditions at the photographing time is transferred to the control unit 116.

The image signal in a buffer 106 is transferred to the signal processing unit 108. The signal processing unit 108 reads the image signal in a single-CCD state on the buffer 106 under the control of the control unit 116, and generates an image signal in a three-CCD state of respective pixels R, G and B which have been subjected to a known interpolation processing, white balance processing and the like.

The R, G and B signals may further be converted into Y, Cb and Cr signals as shown in the following equation (1).

$$\begin{bmatrix} Y \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \begin{bmatrix} R \\ G \\ B \end{bmatrix} \quad (1)$$

The image signal processed at the signal processing unit 108 is transferred to the interval setting unit 109, the feature calculating unit 110 and the gradation converting unit 113. The interval setting unit 109 divides the range of a signal value (pixel value) which the image signal transferred from the signal processing unit 108 can take, into plural intervals (also called classes or bins). The interval setting unit 109 calculates a frequency of the signal value included in each interval and then calculates a histogram (frequency distribution) based upon the calculation result of frequencies.

Figure 2:
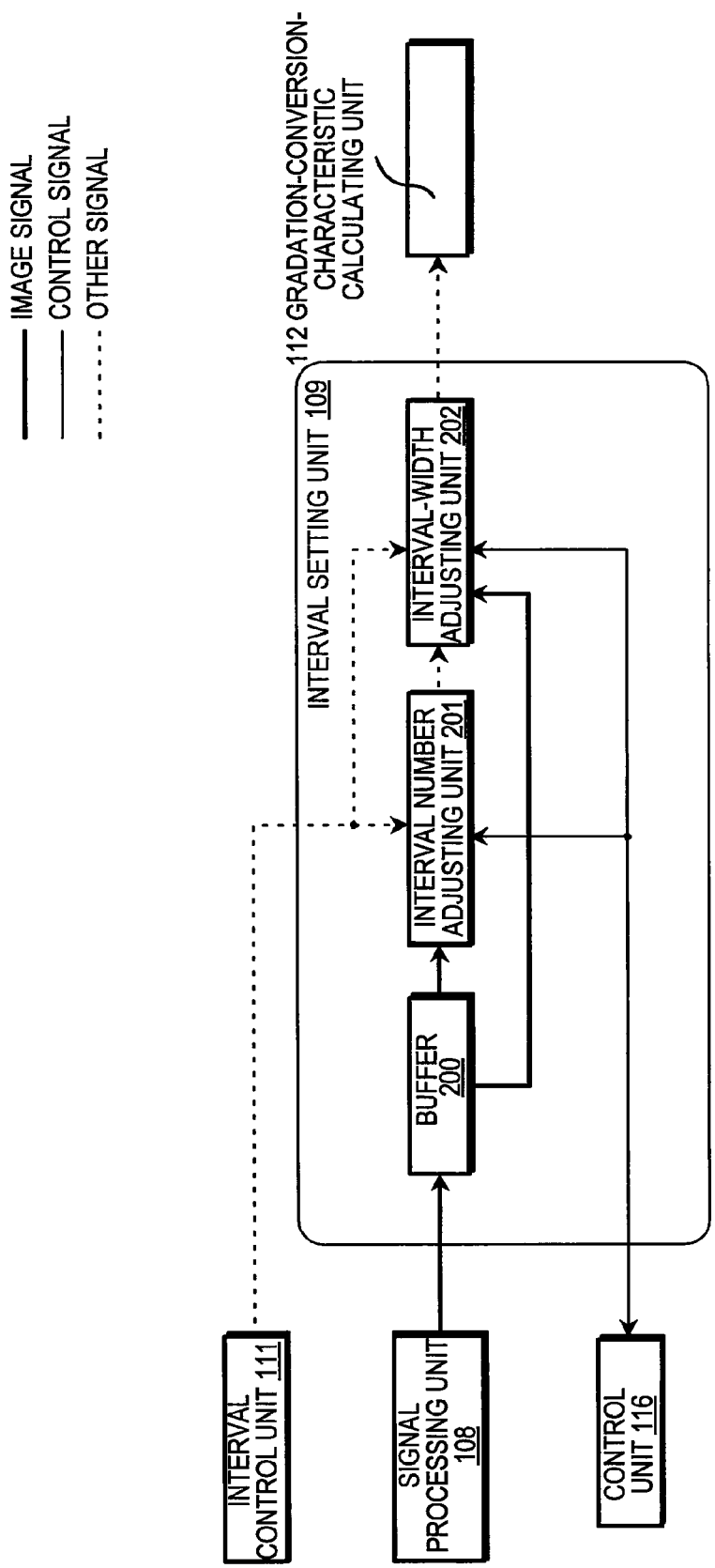
FIG. 2 is a schematic diagram of an interval setting unit.

FIG. 2 shows a schematic diagram of an example of the interval setting unit 109, including a buffer 200, an interval number adjusting unit 201 and an interval width adjusting unit 202. The signal processing unit 108 transfers the image signal to the buffer 200. The interval number adjusting unit 201 adjusts the number of intervals of the signal value (pixel value) of the image signal transferred from the buffer 200 under the control of the interval control unit 111.

FIGS. 4A and 4B show an explanatory diagram of change of the number of intervals in a histogram. FIG. 4A shows a histogram of the image signal transferred to the buffer 200. The number of columns (rectangles) constituting the histogram, namely, the number of intervals is equal to a bit length (the number of gradations) of an input signal, for example, 12 bits (4096 gradations). A pixel intensity value (i) as the signal value of a horizontal axis in FIGS. 4A and 4B may be one of R, G and B signal values or a Y-signal value.

FIG. 4B shows a histogram where the number of intervals has been changed in the histogram shown in FIG. 4A. Incidentally, since the total number of signal values (number of pixels) in the image signal is fixed, the total area of plural columns constituting the histogram is maintained before and after the number of intervals is changed. The histogram in which the number of intervals has been changed is transferred to the interval width adjusting unit 202. The interval width adjusting unit 202 adjusts widths of the intervals in the histogram, using the histogram transferred from the interval number adjusting unit 201 and the image signal transferred from the buffer 200, based upon the control of the interval control unit 111.

Figure 5B:
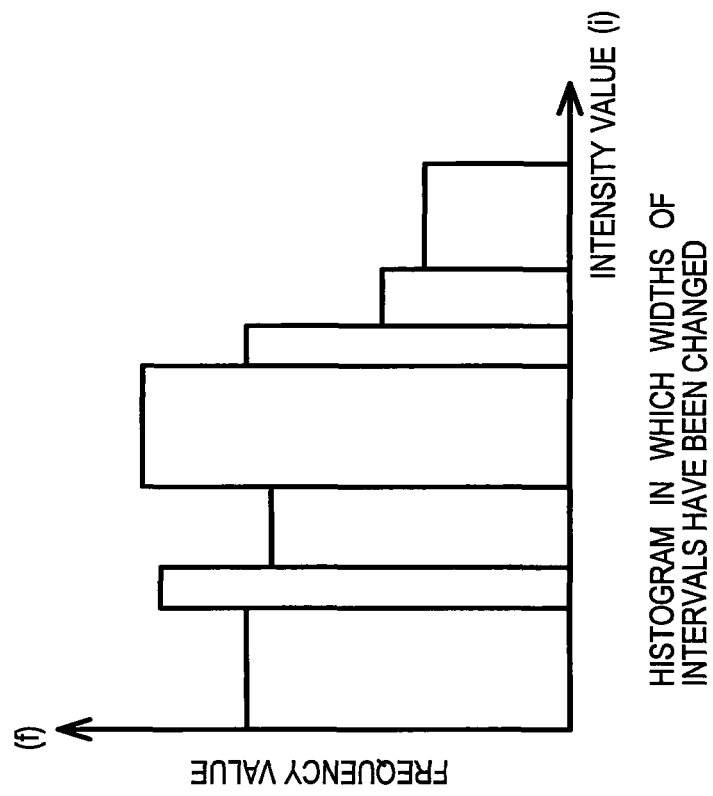
FIG. 5B is a histogram after widths of intervals are changed.
Figure 5A:
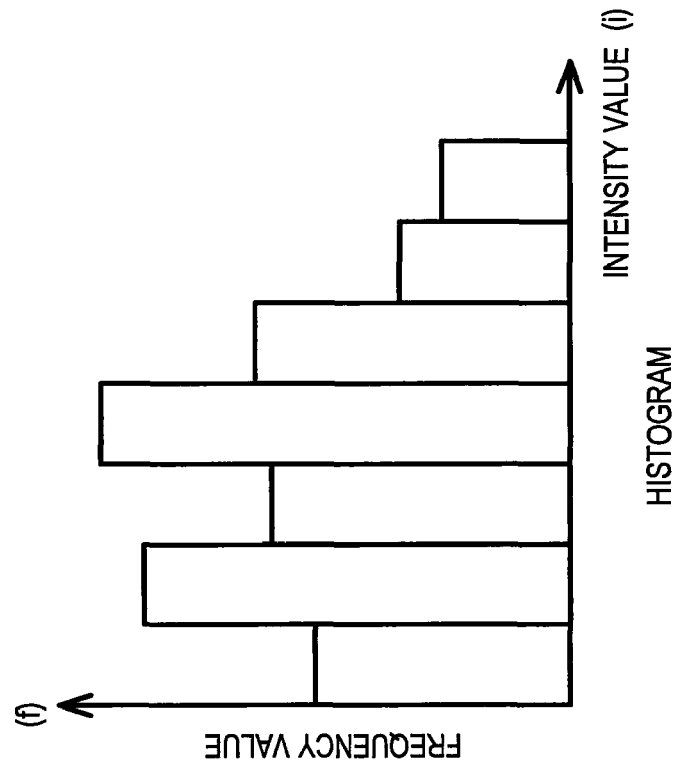
FIG. 5A is a histogram before widths of intervals are changed.

FIGS. 5A and 5B show explanatory diagrams of change of widths of intervals in a histogram. FIG. 5A shows the histogram transferred from the interval number adjusting unit 201. The interval width adjusting unit 202 changes the widths of the intervals in the histogram as shown in FIG. 5B so that the widths of the intervals become uneven. Incidentally, since the total number of signal values is fixed, the total areas of plural columns constituting the histogram are maintained before and after the widths of the intervals are changed. The area of a column constituting the histogram (namely, a value obtained by multiplying the width of an interval by a frequency value (height of the column)) corresponds to the number of signal values (the number of pixels) included in an interval of the column. The histogram in which the widths of the intervals have been changed is transferred to the gradation-conversion-characteristic calculating unit 112.

Though a configuration in which both the interval number adjusting unit 201 and the interval width adjusting unit 202 are provided has been shown here, a configuration in which either one of them is provided may be employed. For example, in the case of a configuration in which only the interval number adjusting unit 201 is provided, widths of intervals constituting a histogram are equal to one another at all positions, but in the case of the constitution in which only the interval width adjusting unit 202 is provided, histogram calculation is performed while the number of intervals is kept at a predetermined number.

The feature calculating unit 110 calculates a feature with respect to the image signal transferred from the signal processing unit 108, and transfers information on the feature to the interval control unit 111. The interval control unit 111 controls the number of intervals and the widths of the intervals at the interval setting unit 109 based upon the information transferred. Processing methods performed at the feature calculating unit 110 and the interval control unit 111 will be described later.

The gradation-conversion-characteristic calculating unit 112 calculates a gradation conversion characteristic (also called gradation conversion function or tone curve) using the histogram transferred from the interval setting unit 109. As one method for gradation-conversion-characteristic calculation, there is a method in which a cumulative histogram shown in FIG. 6B is used as a gradation conversion characteristic.

Figure 6B:
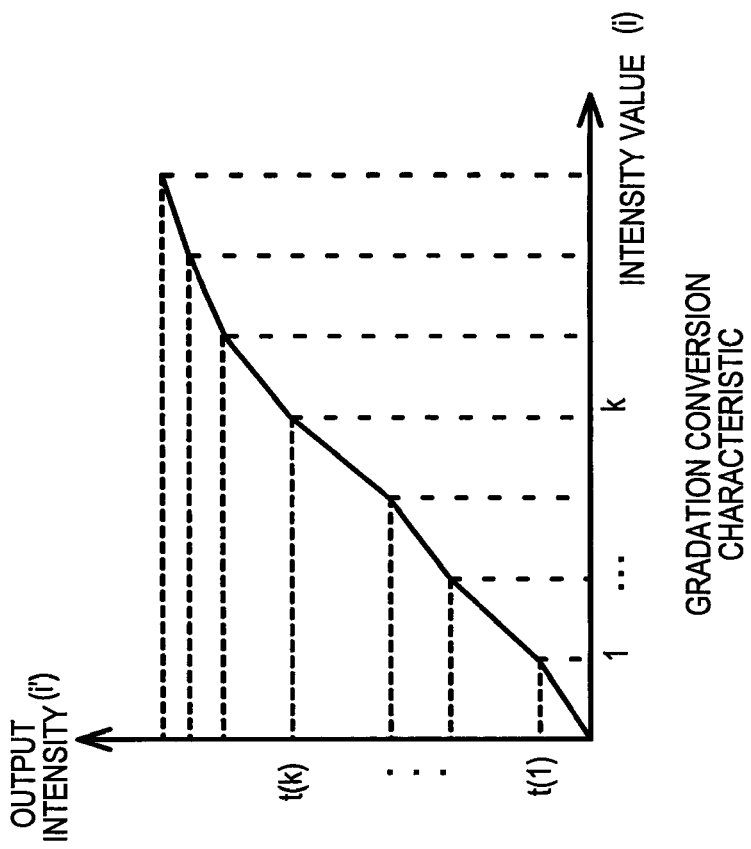
FIG. 6B is a diagram showing a gradation conversion characteristic.
Figure 6A:
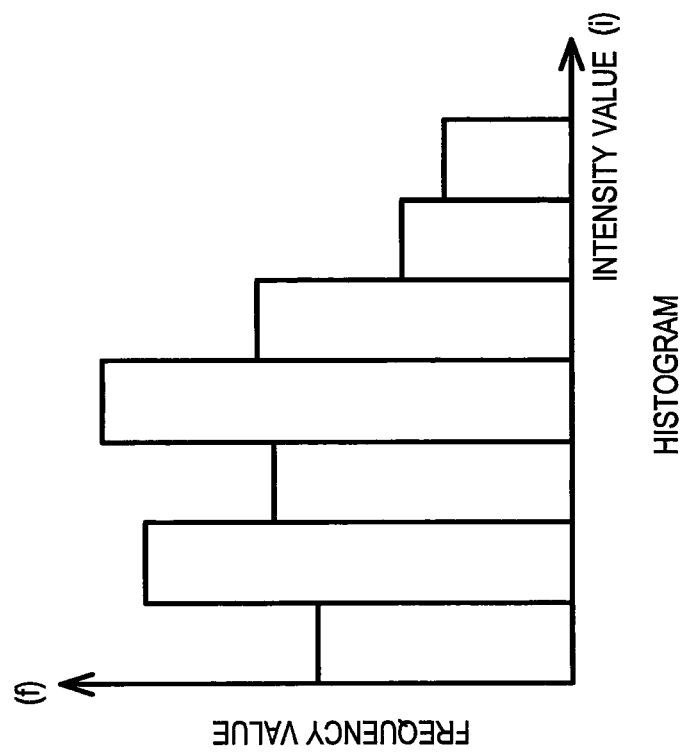
FIG. 6A is an example of a histogram.

FIG. 6A shows a histogram transferred from the interval setting unit 109 and FIG. 6B shows a result of cumulating the histograms (cumulative histogram). A vertical axis t(k) in FIG. 6B indicates an output intensity value with respect to an input intensity value of a horizontal axis. The input intensity value is an intensity value before gradation conversion, and the output intensity value is an intensity value after gradation conversion. Here, a value k indicates an interval number, being associated with the number of intervals in the histogram. By performing gradation conversion using the gradation conversion characteristic, the histogram is smoothed so that contrast is increased.

The gradation conversion characteristic calculated at the gradation-conversion-characteristic calculating unit 112 is transferred to the gradation converting unit 113. The gradation converting unit 113 performs gradation conversion processing to the image signal transferred from the signal processing unit 108 using the gradation conversion characteristic transferred from the gradation-conversion-characteristic calculating unit 112. The gradation conversion processing may be performed on each signal of R, G, and B, or may also be performed on a Y-signal (intensity signal). The image signal which has been subjected to the gradation conversion processing at the gradation converting unit 113 is transferred to the compression unit 114. The compression unit 114 performs compression processing, such as a known JPEG, to the image signal transferred from the gradation converting unit 113, and transfers the same to the output unit 115. The output unit 115 records and stores a compressed signal in a memory card or the like or displays the image signal on an external display screen.

Figure 3:
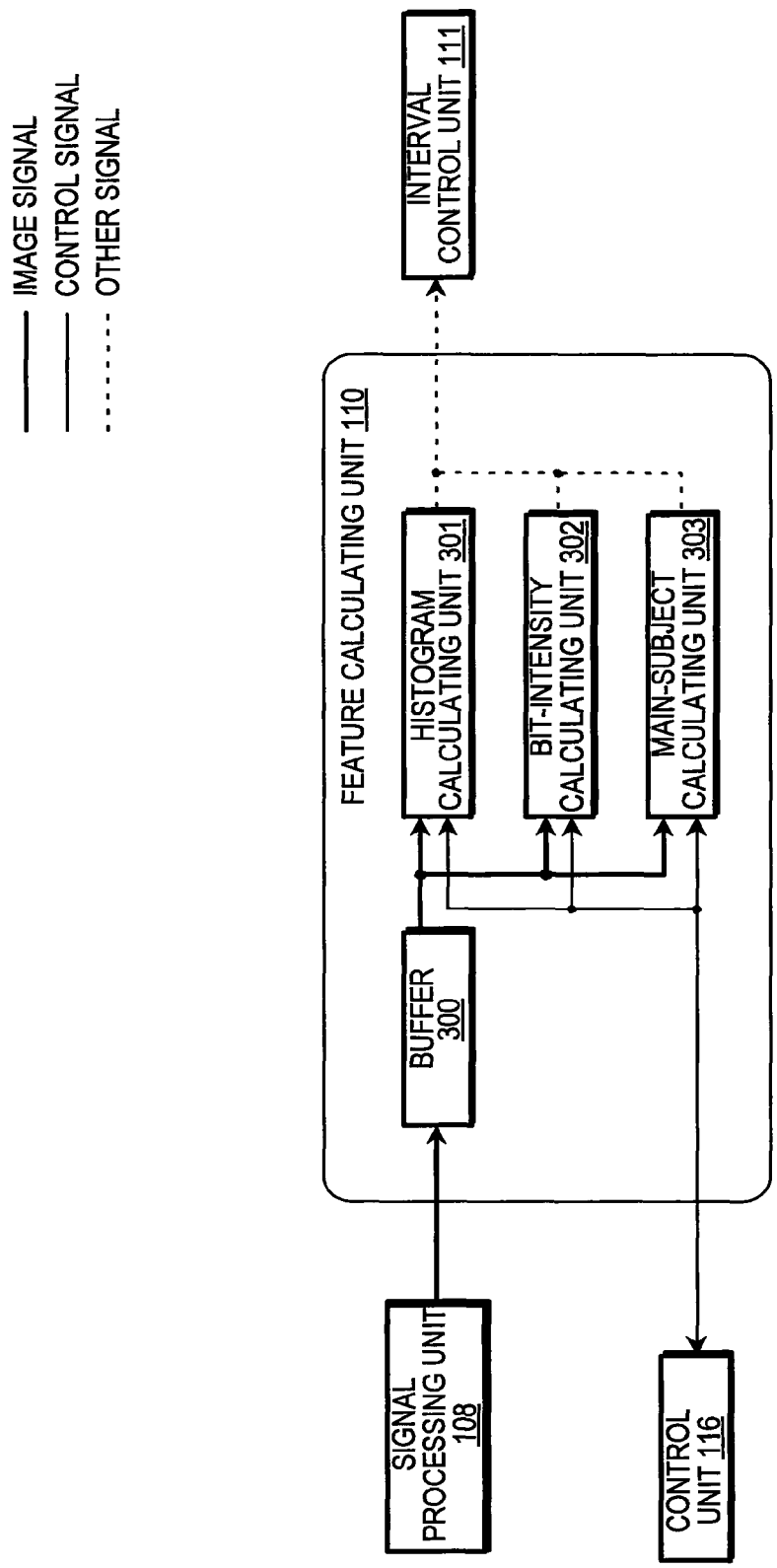
FIG. 3 is a schematic diagram of a feature calculating unit.

FIG. 3 shows a configuration of one example of the feature calculating unit 110, which includes a buffer 300, a histogram calculating unit 301, a bit-intensity calculating unit 302 and a main-subject calculating unit 303. The signal processing unit 108 transfers the image signal to the buffer 300. The buffer 300 transfers the image signal to the histogram calculating unit 301, the bit-intensity calculating unit 302 and the main-subject calculating unit 303.

The histogram calculating unit 301 calculates a histogram similar to that shown in FIG. 4A as a feature or a characteristic of the image signal transferred from the buffer 300. The histogram calculating unit 301 includes number-calculating means adapted to calculate the number of signal values (the number of pixels) included in each interval. The histogram calculated here is different from the histogram calculated at the interval setting unit 109 and transferred to the gradation-conversion-characteristic calculating unit 112. The histogram is calculated with a predetermined number of intervals and the same width of intervals.

The bit-intensity calculating unit 302 calculates an average intensity value and a bit length showing a gradation as features of the image signal transferred from the buffer 300. A G-signal or a Y-signal is used to calculate the average intensity value. The main-subject calculating unit 303 extracts a main subject as a feature of the image signal transferred from the buffer 300, and calculates a histogram, or an average intensity value and a variance value for the main subject. In a case where the main subject is a face, the region of the face is extracted by using a known face-detecting method. A predetermined region in the AF area may be used as a main subject based upon the information from the photographing control unit 107. Each feature is transferred to the interval control unit 111, where the number of intervals and widths of intervals in the histogram are controlled.

Incidentally, the feature calculating unit 110 may be configured so as to include at least one or two of the histogram calculating unit 301, the bit-intensity calculating unit 302 and the main-subject calculating unit 303.

FIGS. 7A-7C show an explanatory diagram of control of widths of intervals or the number of intervals, based upon information on a histogram, performed at the interval control unit 111. When such a histogram as shown in FIG. 7A is obtained as a feature from an image signal, a frequency value h(2) of frequency values h(0) to h(k) in respective intervals is higher (or highest or maximum) than those of the other intervals. For example, the interval control unit 111 detects an interval, the frequency value of which is higher than those of the other intervals, and can calculate the signal value of the detected interval as the information (feature) on the histogram. Here, the value k is 0≤k≤n−1 when the number of intervals in the histogram is n. When a gradation conversion characteristic is calculated from such a histogram, change of the gradation conversion characteristic is steep around an intensity value, the frequency value of which is high, and gradation conversion processing may result in an unnatural image in which contrast of the image signal is excessively enhanced.

Figure 8B:
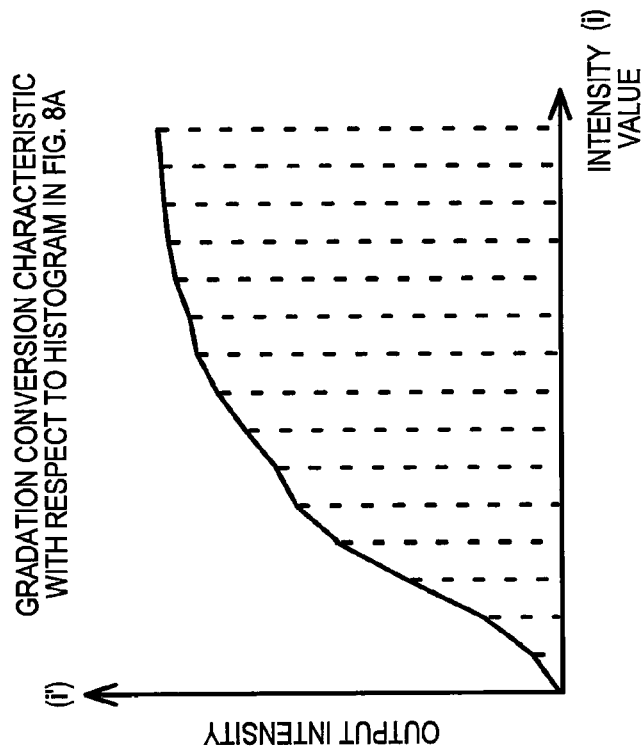
FIG. 8B is a diagram showing a gradation conversion characteristic to the histogram in FIG. 8A.
Figure 8A:
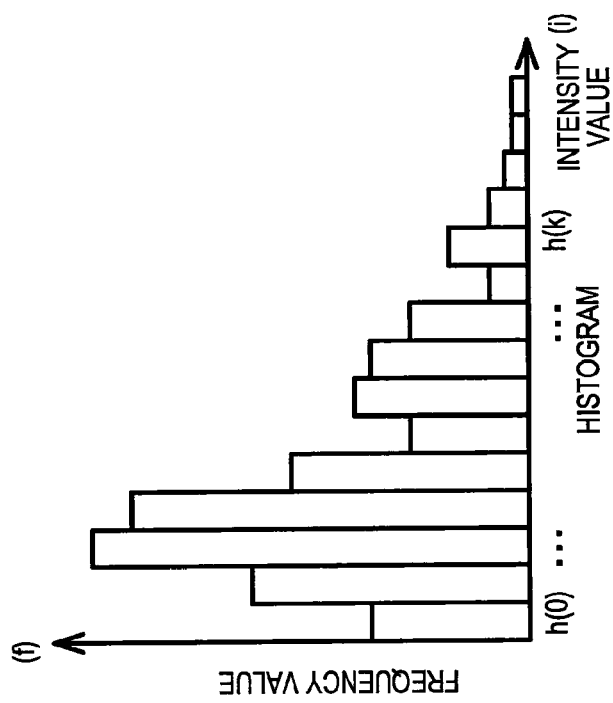
FIG. 8A is an example of a histogram.

As shown in FIG. 8A and FIG. 8B, when a frequency value in the histogram is high in a low intensity portion, the gradation conversion characteristic thereof is a steep characteristic in the low intensity part. In such a case, as shown in FIG. 7B and FIG. 7C, by changing widths of the intervals or the number of intervals in the histogram, steep change in gradation conversion characteristic is suppressed, so that a natural image signal in which contrast is not excessively enhanced can be obtained. In this case, widths of the intervals or the number of intervals may be set according to the numbers of pixels included in respective intervals adjacent to each other and information (feature) on the histogram.

Incidentally, in FIG. 7B, the interval width of an interval in which a frequency value h(2) is higher than those of the other intervals is increased, and interval widths of intervals around the interval having a frequency value h(2) is reduced.

Figure 8D:
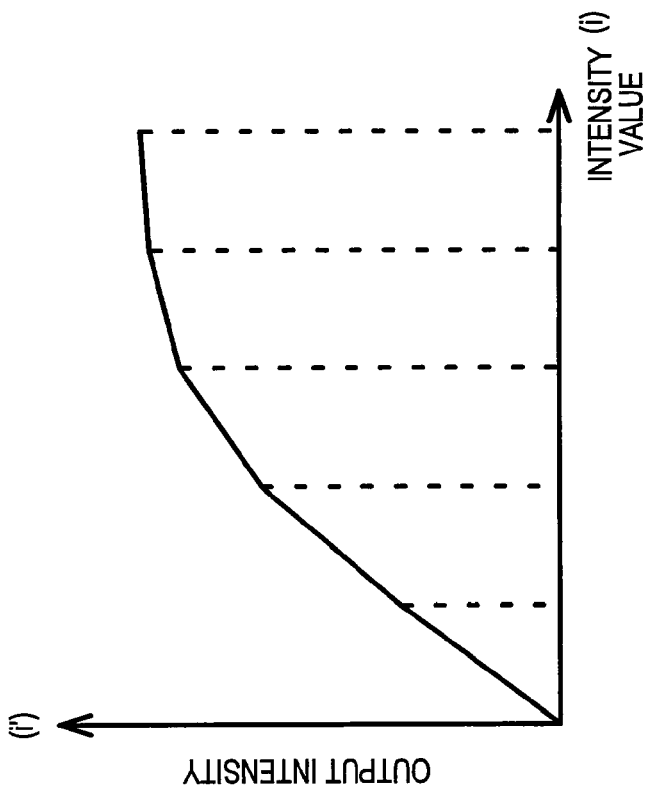
FIG. 8D is a diagram showing a gradation conversion characteristic to the histogram in FIG. 8C.
Figure 8C:
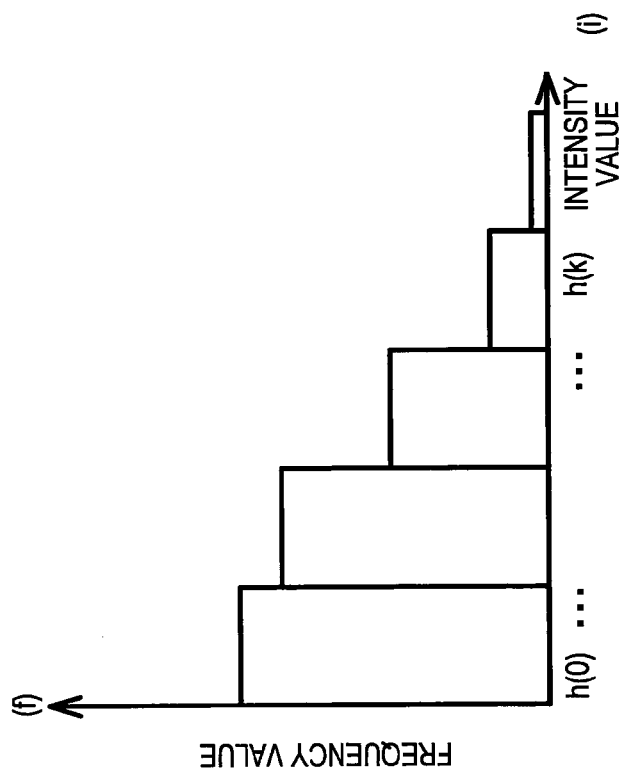
FIG. 8C is an example of a histogram.

As shown in FIG. 8C and FIG. 8D, by changing (reducing) the number of intervals in the histogram in FIG. 8A, the gradation conversion characteristic in a low intensity part becomes gentle, so that gradation conversion processing which does not excessively enhance contrast becomes possible.

The interval control unit 111 can calculate and pick up a steep characteristic in a gradation conversion characteristic calculated from a histogram to change the number of intervals and widths of the intervals at a portion having the steep characteristic. For example, a second-order difference value of the gradation conversion characteristic such as shown in FIG. 6B is used to determine a steep characteristic. The second-order difference value at an interval k is calculated using an output intensity value t(k) like the following equation (2).

$$t''(k)=t(k+1)-2t(k)+t(k-1) \quad (2)$$

When an absolute value of the value t"(k) calculated according to the equation (2) is large, the large absolute value indicates steep change of the gradation conversion characteristic in the interval k, widths of intervals or the number of intervals in a histogram is adjusted such that such an interval as the interval k exhibiting steep change is not included. Thereby, it is possible to obtain a gradation conversion characteristic gentle in change. More specifically, the interval control unit 111 sets a predetermined threshold. When an absolute value of the second-order difference in the equation (2) is larger than the threshold value, the interval control unit 111 enlarges widths of intervals or reduces the number of intervals such that an interval in which the absolute value of second-order difference is larger than the threshold value does not exist in the gradation conversion characteristic.

Though the control based upon the information on the histogram of the feature calculating unit 110 has been explained herein, control based upon other information is similarly performed. There is a case in which an average intensity value and a bit length are used as features. When the average intensity value is equal to or less than a predetermined value, such a possibility is high that a histogram of an image signal has a peak in a low intensity part like FIG. 8A. In this case, when a bit length of the image signal is equal to or less than a predetermined value, performing gradation conversion processing to the image signal having a steep gradation conversion characteristic may result in tone jump by enhancing contrast. Therefore, by changing the number of intervals or widths of intervals in the histogram around the average intensity value (reducing the number of intervals or increasing widths of intervals), the gradation conversion characteristic can be made gentle so that contrast is not excessively enhanced and thus tone jump is not shown up.

When information on a main subject is used as a feature, processing of changing the degree of enhancement of contrast in the main subject is made possible by using an average intensity value and a variance value of intensity of the main subject and changing the number of intervals and/or widths of intervals in a histogram according to these values. For example, when the main subject is a face, a natural image is obtained by performing processing which does not excessively enhance contrast, and when the main subject is a building or the like, a desirable image is obtained by enhancing contrast to some extent.

Of course, control using these features in combination is possible. For example, the interval control unit 111 sets a threshold th(o) corresponding to these features. Then, the interval control unit 111 sets the number of intervals and widths of intervals such that a frequency value of a histogram or the number of pixels included in each of a plurality of intervals satisfies a predetermined condition in relation to the threshold th(o). When a frequency value h(k) of the histogram is higher than a certain threshold th(o), that is, at the case of h(k)>th(o), control of the number of intervals or widths of intervals is performed such that the frequency value is equal to or less than the threshold th(o). Here, a parameter "o" of the threshold th(o) is main-subject information as a feature obtained from the main-subject calculating unit 303. When the main subject is a face, the gradation conversion characteristic which does not enhance contrast can be calculated using a low threshold. When the subject is scenery, the gradation conversion characteristic which enhances contrast can be calculated using a high threshold.

By performing such processing, optimal gradation conversion processing can be performed according to an image signal, and thus a high-definition image signal can be calculated.

Incidentally, in the above embodiment, processing performed by hardware is assumed, but the present invention is not limited to such a configuration. For example, such a configuration can be adopted that an image signal from the CCD 104 is outputted as unprocessed raw data to a computer together with header information such as ISO sensitivity information or image signal size, and is processed separately by software. The software is stored in a computer-readable storage medium as a program. The computer has, for example, a microprocessor and a memory. The program is provided with program codes (instructions) to make the computer execute the following steps.

Figure 9:
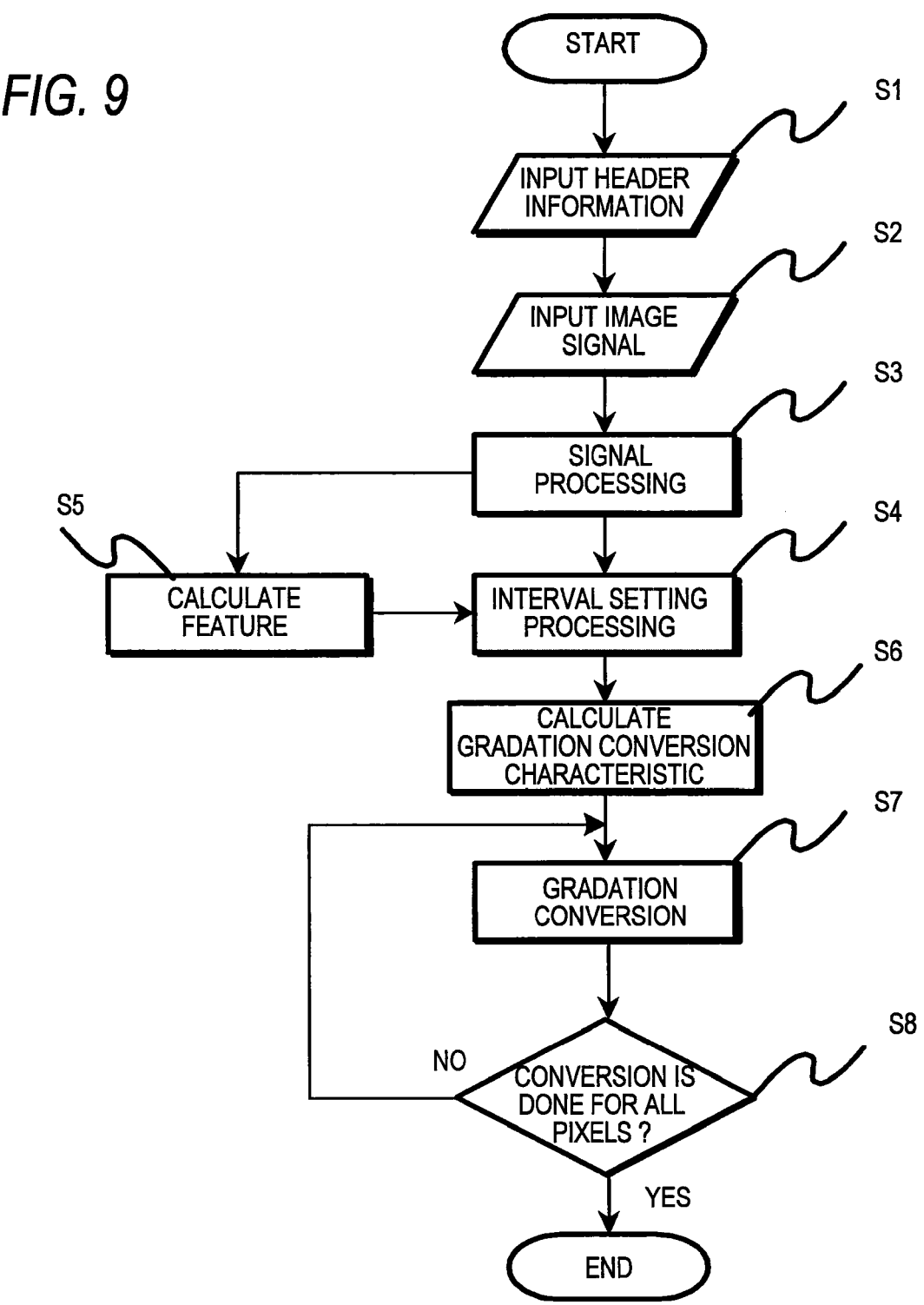
FIG. 9 is a flowchart regarding software according to the first embodiment.

FIG. 9 shows a flowchart of processing executed by software (program) of the first embodiment. When the flowchart is related to the processing in FIG. 1, header information is read at step S1, and an image signal is inputted at step S2. Predetermined signal processing is performed at step S3 corresponding to the signal processing unit 108. Calculation of a feature from the image signal is performed at step S5 corresponding to the feature calculating unit 110. Calculation of a histogram used for calculation of a gradation conversion characteristic is performed, based upon the information from step S5, at step S4 corresponding to the interval setting unit 109. Calculation of the gradation conversion characteristic is performed at step S6 corresponding to the gradation-conversion-characteristic calculating unit 112. Gradation conversion processing is performed to the image signal at step S7 corresponding to the gradation converting unit 113. Whether or not the gradation conversion processing has been performed on all pixels is determined at step S8, and if the gradation conversion processing has been performed on all pixels, the processing is terminated.

Figure 10:
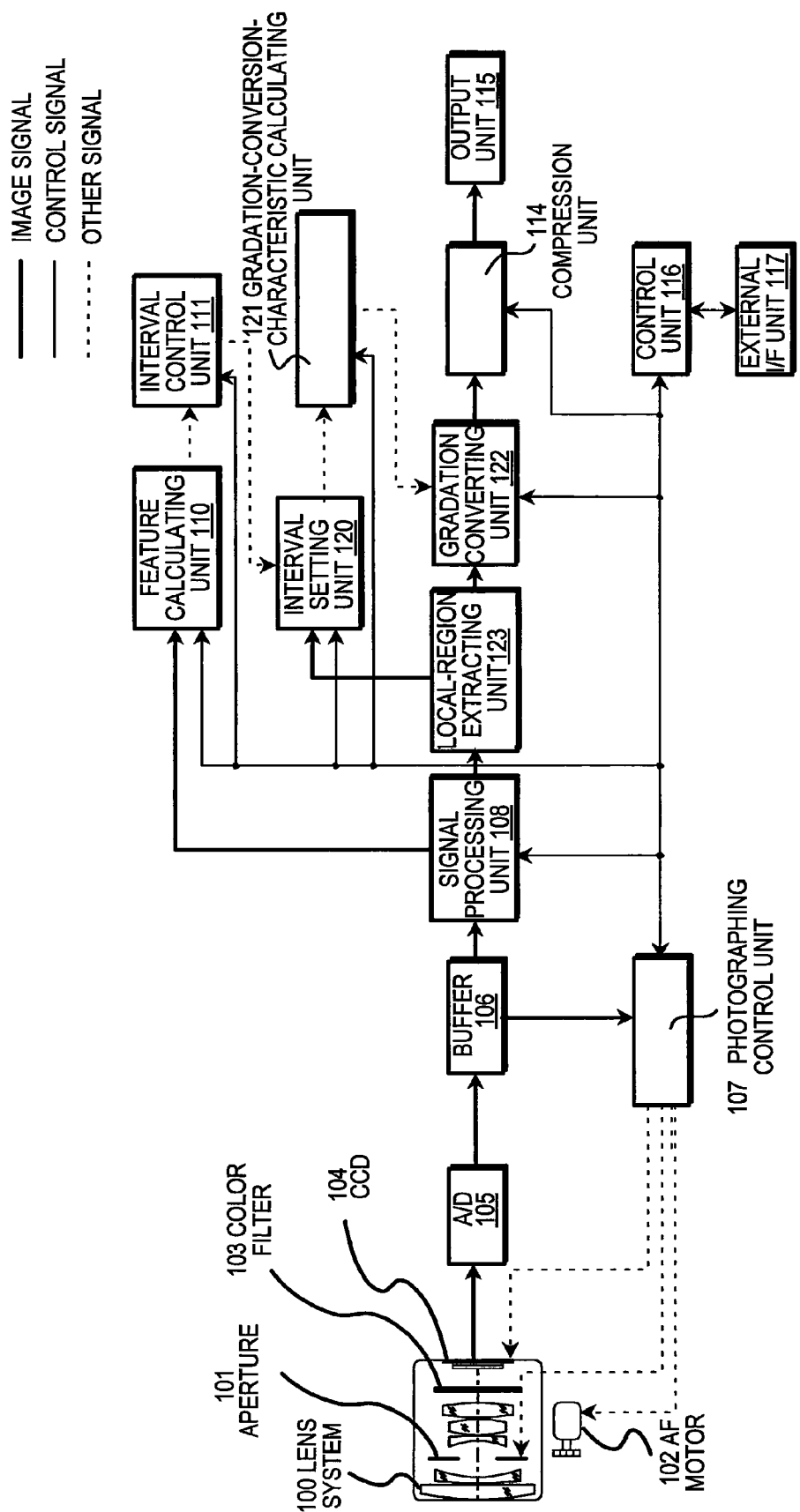
FIG. 10 is a schematic diagram of a signal processor according to a second embodiment.

FIG. 10 is a schematic diagram of a signal processor according to a second embodiment. Same names and reference numerals are assigned to components identical to those in the first embodiment. Hereinafter, only portions different from those of the first embodiment will be explained. The signal processing unit 108 is connected to a local-region extracting unit 123. The local-region extracting unit 123 is connected to an interval setting unit 120 and a gradation converting unit 122. The interval setting unit 120 is connected to a gradation-conversion-characteristic unit 121. The gradation-conversion-characteristic calculating unit 121 is connected to the gradation converting unit 122. The gradation converting unit 122 is connected to the compression unit 114. The control unit 116 such as a microcomputer is bidirectionally connected to the interval setting unit 120, the gradation-conversion-characteristic calculating unit 121 and the gradation converting unit 122.

Portions different from those of the first embodiment will mainly be explained. An image signal is transferred from the signal processing unit 108 to the local-region extracting unit 123. The local-region extracting unit 123 extracts, from the image signal, a local region centering a target pixel (or local region including a target pixel) of the image signal. Then, the local-region extracting unit 123 transfers an image signal of the local region to the interval setting unit 120 and the gradation converting unit 122. The interval setting unit 120 calculates a histogram with respect to the image signal of the local region transferred under the control of the interval control unit 111 like the interval setting unit 109.

The calculated histogram for the local region is transferred to the gradation-conversion-characteristic calculating unit 121. The gradation-conversion-characteristic calculating unit 121 calculates a gradation conversion characteristic for the local region like the gradation-conversion-characteristic calculating unit 112. The gradation conversion characteristic calculated is transferred to the gradation converting unit 122. The gradation converting unit 122 performs gradation conversion processing to the local region of the image signal transferred from the local-region extracting unit 123. Alternatively, gradation conversion processing may be performed to the target pixel in the local region.

By performing such processing, a local gradation conversion characteristic can be controlled according to a feature of the image signal, so that a high-definition image signal can be calculated.

Incidentally, in the above embodiment, processing performed by hardware is assumed, but the present invention is not limited to such a configuration. For example, such a configuration can be adopted that the image signal from the CCD 104 is outputted as unprocessed raw data to a computer together with header information such as ISO sensitivity information or image signal size, and is processed separately by software. The software is stored in a computer-readable storage medium as a program. The computer has, for example, a microprocessor and a memory. The program is provided with program codes (instructions) to make the computer execute the following steps.

Figure 11:
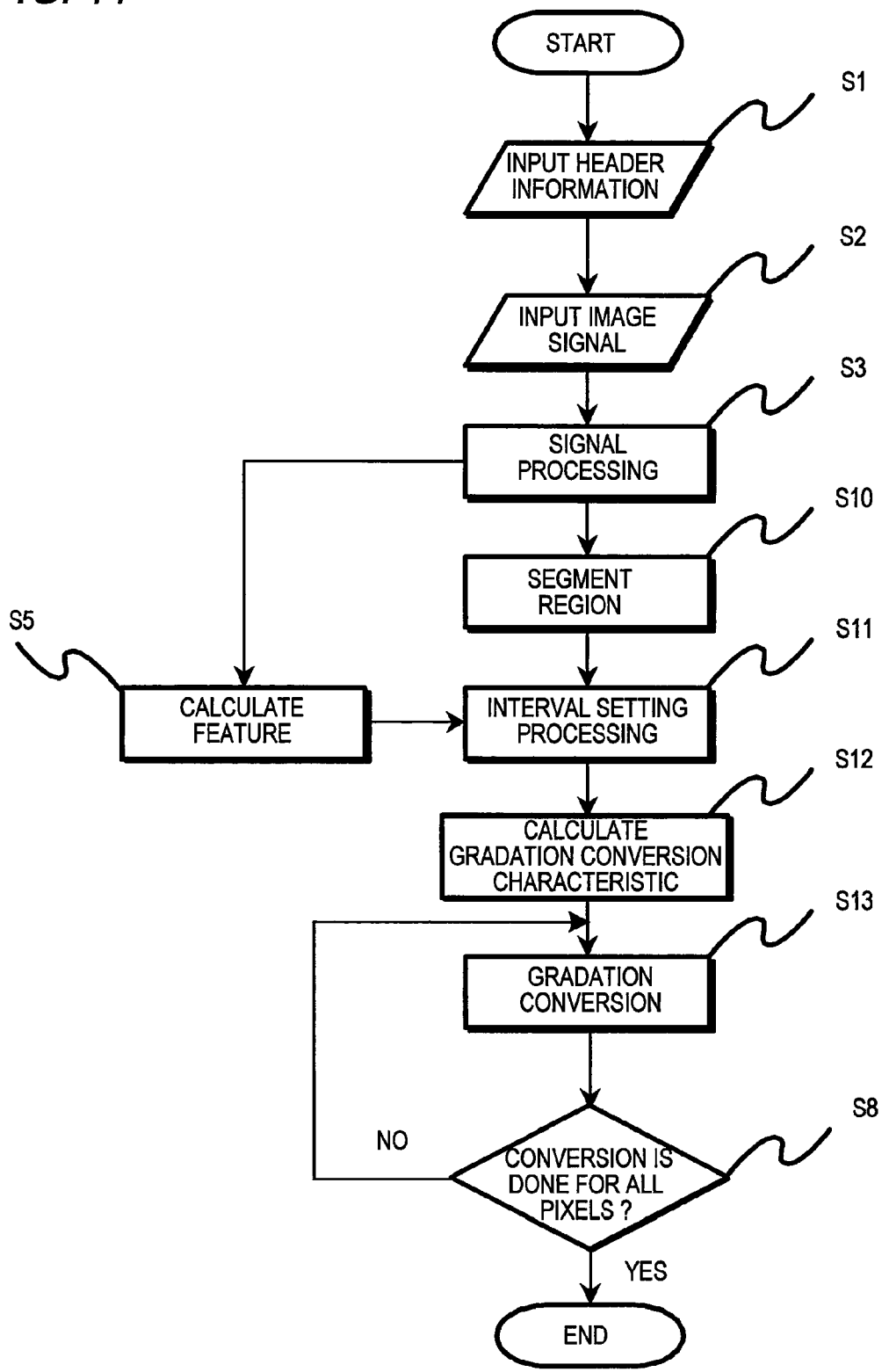
FIG. 11 is a flowchart regarding software according to the second embodiment.

FIG. 11 shows a flowchart of processing executed by software (program) of the second embodiment. The flowchart is related to the processing in FIG. 10. Header information is read at step S1, and an image signal is inputted at step S2. Predetermined signal processing is performed at step S3 corresponding to the signal processing unit 108. A local region centering a target pixel is extracted at step S10 corresponding to the local-region extracting unit 123. Calculation of a feature from the image signal is performed at step S5 corresponding to the feature calculating unit 110. Calculation of a histogram in the local region used for calculation of a gradation conversion characteristic is performed based upon the information from step S5, at step S11 corresponding to the interval setting unit 120. Calculation of the gradation conversion characteristic is performed at step S12 corresponding to the gradation-conversion-characteristic calculating unit 121. Gradation conversion processing is performed to the local region of the image signal at step S13 corresponding to the gradation converting unit 122. Whether or not the gradation conversion processing has been performed on all pixels is determined at step S8, and if the gradation conversion processing has been performed on all pixels, the processing is terminated.

Figure 12:
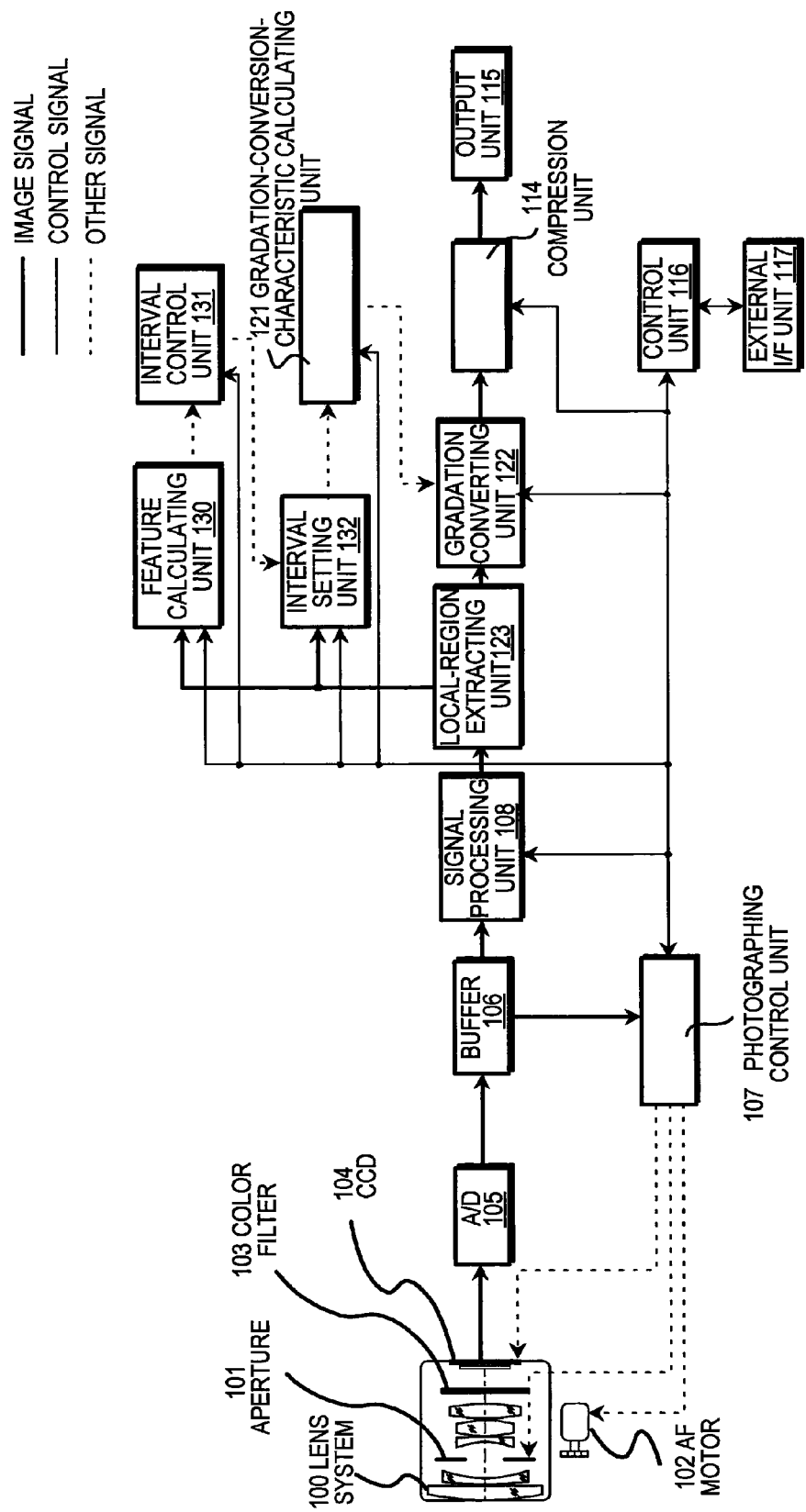
FIG. 12 is a schematic diagram of a signal processor according to a third embodiment.

FIG. 12 is a schematic diagram of a signal processor of a third embodiment. Same names and reference numerals are assigned to components identical to those in the first embodiment. Hereinafter, only portions different from those of the first embodiment will be explained. The signal processing unit 108 is connected to the local-region extracting unit 123. The local-region extracting unit 123 is connected to a feature calculating unit 130, an interval setting unit 132 and the gradation converting unit 122. The feature calculating unit 130 is connected to an interval control unit 131, and the interval control unit 131 is connected to the interval setting unit 132. The interval setting unit 132 is connected to the gradation-conversion-characteristic calculating unit 121. The gradation-conversion-characteristic calculating unit 121 is connected to the gradation converting unit 122, and the gradation converting unit 122 is connected to the compression unit 114. The control unit 116 such as a microcomputer is bidirectionally connected to an interval setting unit 132, the gradation-conversion-characteristic calculating unit 121 and the gradation converting unit 122.

Portions different from those of the first embodiment will mainly be explained. An image signal is transferred from the local-region extracting unit 123 to the feature calculating unit 130. The feature calculating unit 130 calculates a feature in the local region of the image signal like the feature calculating unit 110. The feature is transferred to the interval control unit 131. The interval setting unit 132 calculates a histogram with respect to the image signal of the local region transferred under the control of the interval control unit 131, like the interval setting unit 109.

The histogram of the local region calculated is transferred to the gradation-conversion-characteristic calculating unit 121. The gradation-conversion-characteristic calculating unit 121 calculates a gradation conversion characteristic of the local region like the gradation-conversion-characteristic calculating unit 112. The calculated gradation conversion characteristic is transferred to the gradation converting unit 122. The gradation converting unit 122 performs gradation conversion processing to the local region of the image signal transferred from the local-region extracting unit 123. Alternatively, gradation conversion processing may be performed to the target pixel in the local region.

By performing such processing, a gradation conversion characteristic can be controlled based upon a local feature of the image signal, so that a high-definition image signal can be calculated.

Incidentally, in the above embodiment, processing performed by hardware is assumed, but the present invention is not limited to such a configuration. For example, such a configuration can be adopted that the image signal from the CCD 104 is outputted as unprocessed raw data to a computer together with header information such as ISO sensitivity information or image signal size, and is processed separately by software. Incidentally, the software is stored in a computer-readable storage medium as a program. The program is encoded and stored in a computer-readable format. The computer has, for example, a microprocessor or a memory. The program is provided with program codes (instructions) to make the computer execute the following steps.

Figure 13:
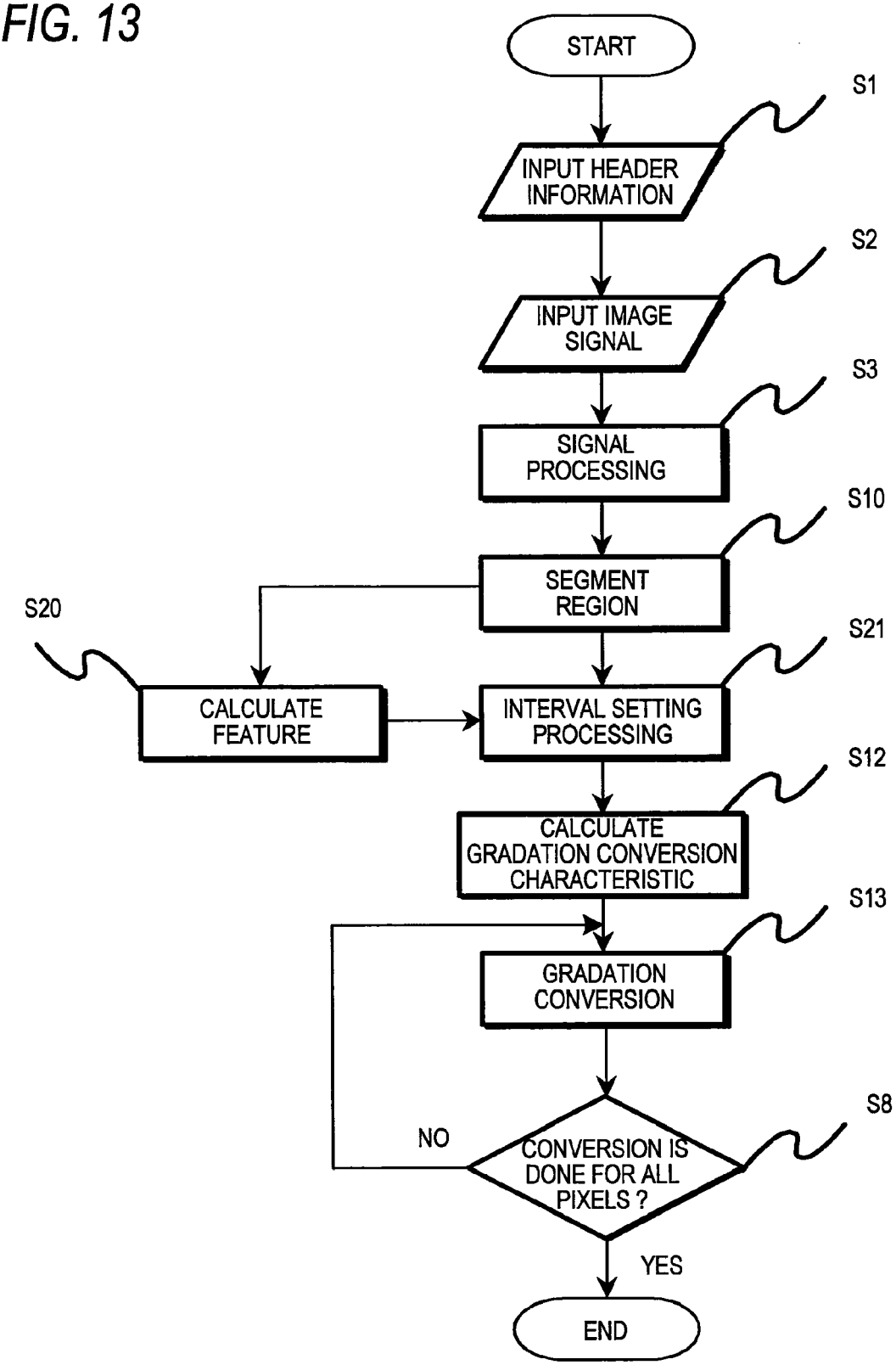
FIG. 13 is a flowchart regarding software according to the third embodiment.

FIG. 13 shows a flowchart of processing executed by software (program) of the third embodiment. The flowchart is related to the processing in FIG. 12. Header information is read at step S1, and an image signal is inputted at step S2. Predetermined signal processing is performed at step S3 corresponding to the signal processing unit 108. A local region centering a target pixel is extracted at step S10. A feature for each local region is calculated at step S20 corresponding to the feature calculating unit 130. Calculation of a histogram in the local region used for calculation of a gradation conversion characteristic is performed based upon the information from step S20, at step S21 corresponding to the interval setting unit 132. Calculation of the gradation conversion characteristic is performed at step S12 corresponding to the gradation-conversion-characteristic calculating unit 121. Gradation conversion processing is performed to the local region of the image signal at step S13 corresponding to the gradation converting unit 122. Whether or not the gradation conversion processing has been performed on all pixels is determined at step S8, and if the gradation conversion processing has been performed on all pixels, the processing is terminated.

It is obvious that the present invention is not limited to the above embodiments and can be variously modified in the scope of a technical idea thereof.

What is claimed is:

1. A signal processor for performing gradation conversion processing using a changed histogram of an image signal, comprising:
   a feature calculating unit which calculates a feature of the image signal;
   a local-region extracting unit which extracts a local region, wherein the local region centers on a target pixel, and wherein the target pixel is selected from pixels of the image signal;
   an interval setting control unit which sets intervals of a pixel value in the changed histogram according to the feature so as to obtain the changed histogram of the local region centering on the target pixel of the image signal, wherein the interval setting control unit sets at least one of: (i) widths of the intervals of the pixel value in the changed histogram, and (ii) a number of the intervals of the pixel value in the changed histogram;

a gradation-conversion-characteristic calculating unit which calculates a gradation conversion characteristic with respect to the local region centering on the target pixel, using the changed histogram of the local region centering on the target pixel obtained by using the intervals set at the interval setting control unit; and a gradation converting unit which performs gradation conversion to the local region centering on the target pixel of the image signal, using the gradation conversion characteristic, wherein the feature calculating unit comprises at least one of:

an original histogram calculating unit which calculates information on an original histogram of the image signal as the feature;

a bit-intensity calculating unit which calculates information on a bit length and an intensity value of the image signal as the feature; and a target subject calculating unit which calculates information on a target subject of the image signal as the feature.

2. The signal processor according to claim 1, wherein the feature calculating unit calculates, as the feature, a feature of the local region, and the interval setting control unit sets the intervals of the pixel value in the changed histogram according to the feature of the local region.

3. The signal processor according to claim 1, wherein the feature calculating unit comprises the original histogram calculating unit.

4. The signal processor according to claim 1, wherein the feature calculating unit comprises the bit-intensity calculating unit.

5. The signal processor according to claim 1, wherein the feature calculating unit comprises the target subject calculating unit.

6. The signal processor according to claim 1, wherein the feature calculating unit comprises at least two of the original histogram calculating unit, the bit-intensity calculating unit, and the target subject calculating unit.

7. The signal processor according to claim 3, wherein the original histogram calculating unit calculates a signal value at a maximum frequency value of the original histogram as the feature.

8. The signal processor according to claim 6, wherein the original histogram calculating unit calculates a signal value at a maximum frequency value of the original histogram as the feature.

9. The signal processor according to claim 1, wherein the interval setting control unit sets the widths of the intervals according to the feature.

10. The signal processor according to claim 1, wherein the interval setting control unit sets the number of the intervals according to the feature.

11. The signal processor according to claim 1, wherein the interval setting control unit sets both the widths of the intervals and the number of the intervals according to the feature.

12. The signal processor according to claim 9, wherein the interval setting control unit sets a threshold (th(o)) according to the feature, and sets the widths of the intervals such that a number of pixels included in each of a plurality of the intervals satisfies a predetermined condition in relation to the threshold (th(o)).

13. The signal processor according to claim 9, wherein the interval setting control unit sets the widths of the intervals according to a number of pixels included in each of intervals adjacent to each other of a plurality of the intervals, and the feature.

14. The signal processor according to claim 10, wherein the interval setting control unit sets a threshold (th(o)) according to the feature, and sets the number of the intervals such that a number of pixels included in each of a plurality of the intervals satisfies a predetermined condition in relation to the threshold.

15. The signal processor according to claim 10, wherein the interval setting control unit sets the number of the intervals according to a number of pixels included in each of intervals adjacent to each other of a plurality of the intervals, and the feature.

16. The signal processor according to claim 9, wherein the interval setting control unit sets the widths of the intervals to be uneven.

17. The signal processor according to claim 1, wherein the interval setting control unit sets the widths of the intervals or the number of the intervals such that an interval, an absolute value of a second difference value of which is larger than a threshold, does not exist in the gradation conversion characteristic.

18. A non-transitory computer-readable storage medium including a program encoded and stored in a computer-readable format, wherein the program causes a computer to execute a method comprising:

a feature calculating step of calculating a feature of an image signal;

a local-region extracting step of extracting a local region, wherein the local region centers on a target pixel, and wherein the target pixel is selected from pixels of the image signal;

an interval setting control step of, for obtaining a changed histogram of the local region centering on the target pixel of the image signal, setting intervals of a pixel value in the changed histogram according to the feature, wherein the interval setting control step sets at least one of: (i) widths of the intervals of the pixel value in the changed histogram, and (ii) a number of the intervals of the pixel value in the changed histogram;

a gradation-conversion-characteristic calculating step of calculating a gradation conversion characteristic with respect to the local region centering on the target pixel, using the changed histogram of the local region centering on the target pixel obtained by using the intervals set at the interval setting control step; and a gradation converting step of performing gradation conversion to the local region centering on the target pixel of the image signal, using the gradation conversion characteristic, wherein the feature calculating step comprises at least one of:

an original histogram calculating step of calculating information on an original histogram of the image signal as the feature;

a bit-intensity calculating step of calculating information on a bit length and an intensity value of the image signal as the feature; and a target subject calculating step of calculating information on a target subject of the image signal as the feature.

* * * * *